United States Patent
Low et al.

[15] 3,663,753
[45] May 16, 1972

[54] LIGHT SENSOR

[72] Inventors: George M. Low, Deputy Administrator of the National Aeronautics and Space Administration with respect to an invention of; Louis F. Schmidt, 1744 Brae Burn Road, Altadena, Calif. 91001

[22] Filed: July 22, 1970

[21] Appl. No.: 57,252

[52] U.S. Cl. .................................. 178/7.92, 350/175 FS
[51] Int. Cl. ............................................. H04n 1/00
[58] Field of Search ............... 178/7.92, 7.85, 6; 350/58, 350/206, 228, 175 FS

[56] References Cited

UNITED STATES PATENTS

| | | | |
|---|---|---|---|
| 3,429,997 | 2/1969 | Rosner et al. | 178/7.85 |
| 2,762,262 | 9/1956 | Bertele | 350/228 |
| 3,516,734 | 6/1970 | Schmidt | 350/206 |
| 2,665,618 | 1/1954 | Heidecke | 350/58 |
| 3,290,505 | 12/1966 | Stavis | 178/7.92 |

*Primary Examiner*—Robert L. Griffin
*Assistant Examiner*—Richard P. Lange
*Attorney*—J. W. Warden, Paul F. McCaul and John R. Manning

[57] ABSTRACT

A light sensor is disclosed having an objective lens system capable of producing a backwardly curving image plane of a starfield which matches the similarly curved surface of the photocathode of an image dissector tube. The objective lens system comprises an airspaced triplet coupled to a clear glass faceplate on the image dissector tube. The triplet comprises an entrance lens having a convex-convex configuration, a second lens having a convex-plano configuration, and a third lens having a concave-convex configuration. The faceplate of the image dissector tube has a plano-concave configuration with the concave surface being the photocathode upon which the starfield is imaged.

8 Claims, 2 Drawing Figures

Patented May 16, 1972
3,663,753
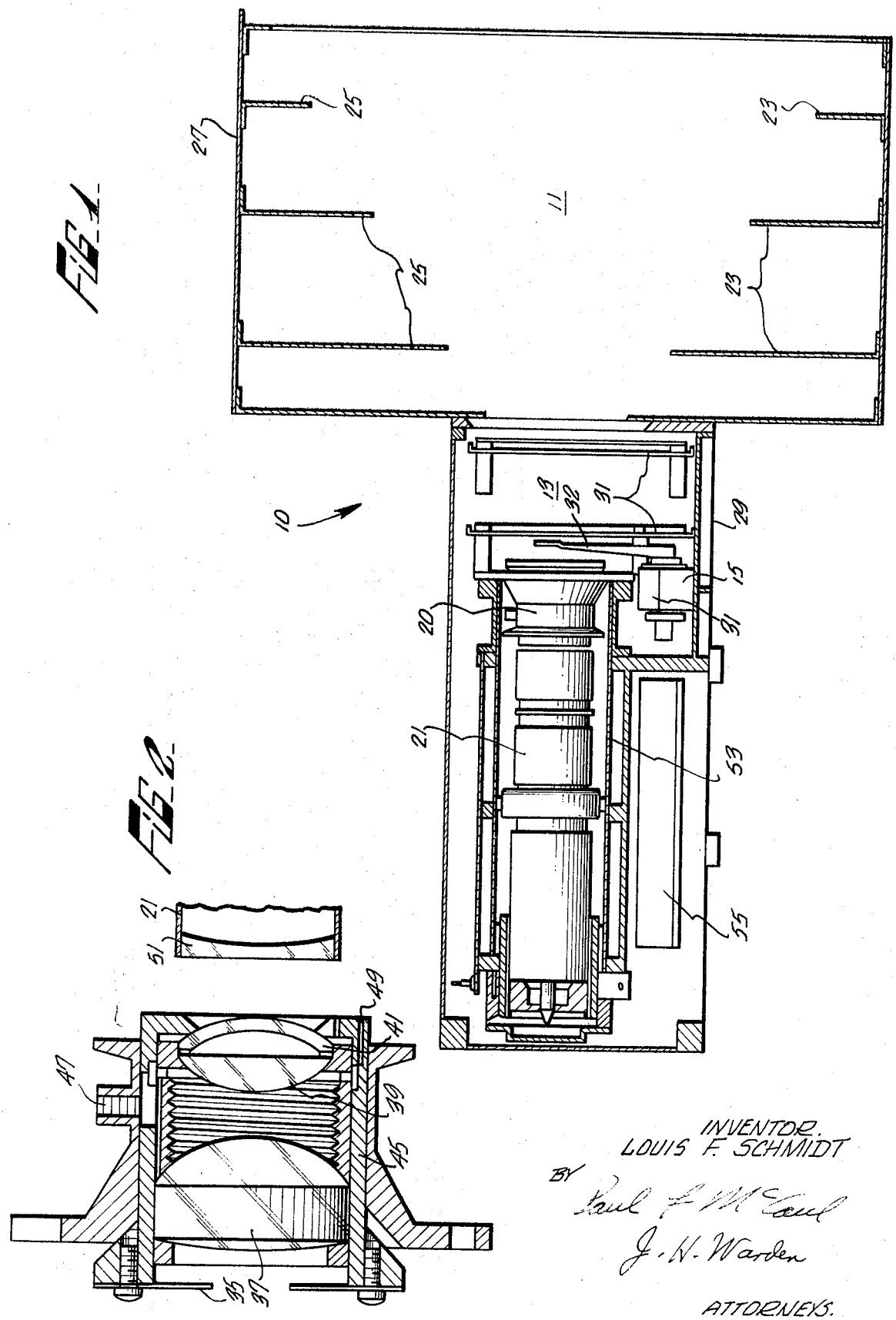
INVENTOR.
LOUIS F. SCHMIDT
BY Paul F. McCaul
J. N. Warden
ATTORNEYS.

LIGHT SENSOR

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The present invention relates to light sensing devices for controlling orientation of an object relative to the sun or other light source and more particularly to optical lens systems utilized in such light sensing devices.

2. Description of the Prior Art

To date, many space vehicles have been attitude-controlled in three axes to provide a known and stable orientation during flight. Although inertial sensors are utilized in such spacecraft to provide short-term position, stability and rotation rate control, attitude control throughout the major portion of the flight is maintained by optical sensors. An accurately controlled spacecraft is particularly needed to achieve midcourse maneuvers. Such maneuvers are usually made under gyro control by performing two commanded turns in sequence from the base orientation to orient the thrust vector of the rocket motor.

Space vehicles have all used the sun as a yaw and pitch reference object as well as a source of electrical power. Solar panels on the vehicles are deployed after launch to present a large surface area to the sun's illumination. Yaw and pitch attitude control is necessary to maintain a steady illumination level on the solar cells.

Although various reference objects have been utilized for roll-stabilization, the most ideally located roll reference is the star Canopus. Canopus is the second brightest star in the sky and is situated about 15° from the south ecliptic pole.

Spacecraft attitude control is typically initiated immediately after separation from the last stage rocket. Gyros provide limiting rate control and damping during the acquisition phase. Yaw and pitch acquisition of the sun is accomplished first with the spacecraft orientation being controlled so as to null the sun sensor error signals. Subsequently, the spacecraft is rolled about the sun line at a fixed rate under gyro control until Canopus enters the star sensor field of view and is acquired. Shortly thereafter, the gyros are turned off.

The spacecraft's star sensor functions (1) to identify each star that enters the field of view during the roll search and (2) to provide a signal proportional to the roll-error angle to the attitude control circuitry when Canopus is identified. The identification process in the sensor consists of measuring the star intensity and comparing it with a previously calibrated value.

Error-angle information is obtained by repetitively scanning a slit field of view across the image field and then measuring the modulation phase of the star signal that appears. Gimballing is provided to accommodate the apparent motion of Canopus. During the course of an orbit by the sun-pointing spacecraft, the starfield will appear to rotate about the ecliptic pole and the sun-spacecraft-Canopus angle will vary sinusoidally, with a peak-to-peak excursion of 30°.

Original star sensor design had relied principally on mechanical devices for star signal modulation and gimballing. However, an interplanetary mission is necessarily many thousands of hours in duration, and the probability of failure of a mechanical device was considered to be unacceptably large. As a result an all-electrostatic image dissector was developed which combined in one envelope, the gimballing, scanning, and photomultiplier detector functions.

The image dissector conventionally has a backwardly curving, spherically shaped photocathode upon which the starfield is imaged. Because it was not possible previously to design a lens system which would produce a starfield image matching this curvature, the image dissectors incorporated a fiber-optics transmission medium in the faceplate which effected the necessary translation in planes. A shortcoming with such a system is that fiber-optic lenses are extremely expensive to manufacture and require a long lead time for procurement.

Early star trackers utilized a reflective lens system in conjunction with the fiber-optics-faceplated image dissector. The problems associated with the fiber-optic lens still were present, along with the additional problem that the reflective lens system required a very large aperture, which in turn necessitated the use of a comparatively large stray light baffle assembly positioned in front of the aperture.

Other refractive lens systems were later utilized with the fiber-optic-faceplated image dissector with no apparent improvement over the original systems.

In attempting to eliminate the fiber-optic lens as a part of the image dissector face plate, various proposals were considered. However, these proposals were unsuitable because they still created a flat image plane which, of course, did not match with the backwardly curving photocathode of the image dissector. Moreover, some proposals required a stop between the lens elements rather than before the aperture. As a result a much larger stray baffle assembly was necessary because of the size of the lens aperture and the absence of a front stop. Furthermore, some proposals required the use of aspheric lenses which are difficult and costly to fabricate.

OBJECTS AND SUMMARY OF THE INVENTION

The present invention obviates the above-mentioned shortcomings by providing an objective lens system capable of producing a backwardly curving image plane in order to match the similarly curved surface of the photocathode of the image dissector tube. The objective lens system comprises an airspaced triplet coupled to a clear glass faceplate on an image dissector tube. The triplet comprises an entrance lens having a convex-convex configuration with a stop being positioned between the starfield and the entrance lens. A second lens of a convex-plano configuration is disposed behind the entrance lens along the optic axis. A concave-convex lens is the third element of the triplet and is positioned behind the second lens along the optic axis. These lenses are assembled in a tubular housing with porting holes and grooves provided to permit outgassing during evacuation tests. The entrance lens is preferably fabricated from fused silica to provide a certain amount of radiation protection for the other lens elements. The faceplate of the image dissector tube has a plano-concave configuration with the concave surface being the photocathode upon which the starfield is imaged.

A primary object of the present invention is to provide an objective lens system for a conventional image dissector tube that eliminates the need for a specially designed faceplate utilizing fiber-optics.

Another object of the present invention is to provide a light direction sensor that can be manufactured at much less cost and in a shorter procurement cycle.

Still another object of the present invention is to provide a light direction sensor that is capable of utilizing a relatively small stray light baffle assembly.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWINGS

FIG. 1 is a sectional view of the light direction sensor of the present invention; and FIG. 2 is an enlarged sectional view of the objective lens system of the present invention.

DESCRIPTION OF THE PREFERRED EMBODIMENT

Referring now to the drawings, FIG. 1 shows a light direction sensor, generally indicated by arrow 10, whose main components comprise: an outer stray light baffle assembly 11; an inner stray light baffle assembly 13; a sun shutter 15; an objective lens assembly 20; and an image dissector tube 21.

The outer stray light baffle assembly 11 comprises a plurality of baffle plates 23 longitudinally spaced along the optic axis with the plates 23 having progressively smaller rectangular apertures 25 formed therein as they approach the interior of the apparatus. The baffle plates 23 are mounted within a rectangular housing 27 while the inner stray light baffle assembly 13 is located within the main housing 29. The inner assembly 13 also comprises a plurality of baffle plates 31 longitudinally positioned along the optic axis with each plate being apertured to admit the desired starfield to transverse therethrough.

The sun shutter 15 is positioned between the inner baffle assembly 13 and the objective lens assembly 20 and functions to close off the field of view from the apparatus when the sun enters the field of view. The sun shutter 15 is actuated by a photoresistive sun sensor (not shown) mounted on the exterior portion of the housing 27, with the sun shutter 15 comprising a blade 32 mounted on a rotary solenoid 33 designed for operation in the outer space environment.

The objective lens assembly 20 is more clearly illustrated in FIG. 2, which shows a stop 35 positioned between the starfield and an entrance lens 37 which is of a convex-convex configuration. The stop 35 is used in conjunction with the lens system and the two stage baffle arrangement to overcome the stray light problem. A second lens 39 of a convex-plano configuration is disposed behind the entrance lens 37 along the optic axis, while a third lens 41 is positioned adjacent the backside of the lens 39, the third lens 41 is of a concave-convex configuration with the outer rim of the concave surface closely spaced from the outer rim of the planar surface of the lens 39 to form an airspace pocket 43 therebetween.

The lenses 37, 39 and 41 are assembled in a tubular housing 45 with porting holes 47 and grooves 49 provided to permit outgassing during evacuation tests.

The image dissector tube 21 comprises a faceplate 51 of a plano-concave configuration with the concave surface being the photocathode upon which the starfield is imaged.

The entrance lens 37 is preferably fabricated from fused silica to provide a certain amount of radiation protection for the other lens elements. Also in the preferred embodiment, the radius of the first convex surface of the entrance lens 37 is 7.4874 inches while the radius of the second convex surface is −0.7260. The thickness of the entrance lens 37 at its widest point is 0.6956 inches. The radius of the convex surface of the second lens 39 is 0.7260 inches, while the radius of the planar surface is, of course, infinity. The thickness of the second lens 39 at its axis is 0.2054 inches. The distance between the entrance lens 37 at its axis on the second convex surface and that of the second lens 39 at its optic axis on the convex surface is −0.2450 inches. The concave surface of the third lens 41 is of a radius of −0.7178 inches, while the convex surface is −1.0572 inches. The thickness of the lens 41 at its optic axis is 0.0496 inches. The distance between the planar surface of lens 39 and the concave surface of lens 41 at the optic axis is 0.1600 inches. The radius of the planar surface of the faceplate 51 is, of course, infinity, while the radius of the concave surface is 1.250 inches. The thickness of the faceplate 51 at its axis is 0.040 inches. The distance between the convex surface of the third lens 41 at its axis at the planar surface of the faceplate 51 at its axis is 0.2400 inches. The glass type for the entrance lens 37 is fused quartz, while for the second and third lens 39 and 41 the glass type is 1.5841–408. The glass type for the faceplate 51 is 0–122 CORNING.

A magnetic shield 53 envelops the image dissector tube 21 with the electronic circuit components 55 mounted about the image dissector tube 21 with the main housing 29.

OPERATION

In operation, the objective lens assembly 20 produces an image plane of the starfield which is backwardly curving to match the photocathode surface of the faceplate 51 of the image dissector tube 21. Because of this, the faceplate 51 can be made of clear glass, which represents a substantial savings in the direct and peripheral costs associated with incorporating fiber-optics into image dissector tubes.

The improved optical system also enhances resolution and reliability of the entire system.

It should be noted that various modifications can be made to the apparatus while still remaining within the purview of the following claims.

WHAT IS CLAIMED IS:

1. A light sensor for sensing a field at infinity comprising:
   an image dissector tube having a faceplate of a plano-concave configuration with the concave surface being the photocathode, said faceplate being made of clear glass; and
   objective lens means for producing a backwardly curving image plane similar to the curved surface of the photocathode, and for imaging said image plane on said photocathode surface, said objective lens means consisting of an entrance lens having a convex-convex configuration, a second lens having a convex-plano configuration, and a third lens having a concave-convex configuration.

2. The invention of claim 1 wherein the three lens elements are positioned on a common optic axis with the faceplate of the image dissector tube.

3. The invention of claim 2 wherein the rim of the concave surface of the third lens is closely spaced to the rim of the planar surface of the second lens to form an airspace pocket therebetween.

4. The invention of claim 1 further comprising a stop positioned in front of the entrance lens.

5. The invention of claim 1 further comprising baffle means for preventing any undesired stray light from impinging on said entrance lens.

6. The invention of claim 1 wherein said entrance lens is made of fused silica.

7. The invention of claim 1 wherein the lens elements of said objective lens means are mounted within a tubular housing.

8. The invention of claim 7 wherein said housing comprises means for evacuating the interior of said housing.

* * * * *